US009088755B2

(12) United States Patent
Luo et al.

(10) Patent No.: US 9,088,755 B2
(45) Date of Patent: Jul. 21, 2015

(54) CONSTANT CURRENT CONTROL DEVICE AND TELEVISION HAVING THE SAME

(71) Applicant: Shenzhen Skyworth-RGB Electronics Co. Ltd., Shenzhen, Guangdong Prov. (CN)

(72) Inventors: Xian-Liang Luo, Shenzhen (CN); Yan-Sheng Shao, Shenzhen (CN); Ji Bai, Shenzhen (CN)

(73) Assignee: SHENZHEN SKYWORTH-RGB ELECTRONICS CO. LTD., Shenzhen, Guangdong Prov. (CN)

( * ) Notice: Subject to any disclaimer, the term of this patent is extended or adjusted under 35 U.S.C. 154(b) by 202 days.

(21) Appl. No.: 13/844,875

(22) Filed: Mar. 16, 2013

(65) Prior Publication Data

US 2014/0111702 A1 Apr. 24, 2014

(30) Foreign Application Priority Data

Oct. 19, 2012 (CN) .......................... 2012 1 0401347

(51) Int. Cl.
*H05B 33/08* (2006.01)
*H04N 5/66* (2006.01)
*H04N 5/63* (2006.01)

(52) U.S. Cl.
CPC ............... *H04N 5/66* (2013.01); *H05B 33/086* (2013.01); *H05B 33/0815* (2013.01); *H05B 33/0827* (2013.01); *H04N 5/63* (2013.01); *Y02B 20/347* (2013.01)

(58) Field of Classification Search
USPC .......... 315/185 R, 192, 193, 209 R, 291, 294, 315/307, 312
See application file for complete search history.

(56) References Cited

U.S. PATENT DOCUMENTS

| 2007/0108958 | A1* | 5/2007 | Minakuchi et al. | 323/316 |
| 2008/0224632 | A1* | 9/2008 | Noda | 315/291 |
| 2011/0062872 | A1* | 3/2011 | Jin et al. | 315/122 |
| 2011/0148323 | A1* | 6/2011 | Yao et al. | 315/295 |
| 2013/0147375 | A1* | 6/2013 | Williams et al. | 315/192 |

* cited by examiner

*Primary Examiner* — Douglas W Owens
*Assistant Examiner* — Thai Pham
(74) *Attorney, Agent, or Firm* — Tim Tingkang Xia, Esq.; Locke Lord LLP

(57) ABSTRACT

The invention provides a constant current control device and a television including the constant current control device. The constant current control device includes a constant current control module and a switched-mode power supply module used for providing a stable voltage for a load. The constant current control module includes a constant current source unit used for providing a reference current, a constant current control unit used for keeping a current flowing through the load constant as the reference current, and a feedback unit used for keeping the voltage of the constant current control unit constant. The present invention, with a simple circuit structure, implements the objective of precisely controlling a current passing through a load.

14 Claims, 3 Drawing Sheets

US 9,088,755 B2

CONSTANT CURRENT CONTROL DEVICE AND TELEVISION HAVING THE SAME

CROSS-REFERENCE TO RELATED APPLICATION

This application claims the priority to Chinese Patent Application No. 201210401347.8, filed in the State Intellectual Property Office of P.R. China, on Oct. 19, 2012, which is hereby incorporated herein in its entirety by reference.

FIELD OF THE INVENTION

The present invention relates generally to the field of constant current control technology, and more particularly to a constant current control device and a television including the constant current control device.

BACKGROUND OF THE INVENTION

Light emitting diodes (LEDs), as a low-power consumption, environmentally friendly light source, are widely applied in the fields such as lighting and backlight display. To make an LED emit stable light, a current flowing through the LED is required to be relatively constant, and especially, when LEDs are used as a backlight source for a display, the currents flowing through each LED chip are further required be equalized as much as possible, in order to achieve a desirable display effect.

Therefore, how to achieve precise control of a current flowing through an LED with a simple circuit structure is a technical problem urgent to be solved

SUMMARY OF THE INVENTION

One of the objectives of the present invention is to provide a constant current control device, to precisely control a current passing through a load with a simple circuit structure.

In one aspect of the present invention, a constant current control device includes a constant current control module and a switched-mode power supply module used for providing a stable voltage for a load.

In one embodiment, the constant current control module includes a constant current source unit used for providing a reference current, a constant current control unit used for keeping a current flowing through the load constant as the reference current, and a feedback unit used for keeping the voltage of the constant current control unit constant, where an output terminal of the switched-mode power supply module is electrically connected to an input terminal of the load, an output terminal of the constant current source unit is electrically connected to a first input terminal of the constant current control unit, an output terminal of the load is electrically connected to a second input terminal of the constant current control unit, an output terminal of the feedback unit is electrically connected to a control terminal of the constant current control unit, a first input terminal of the feedback unit and a first input terminal of the switched-mode power supply module are both connected to a first output terminal of the constant current control unit, and a second input terminal of the feedback unit and a second input terminal of the switched-mode power supply module are both connected to a second output terminal of the constant current control unit.

In one embodiment, the constant current control unit includes a constant current control circuit and a voltage adjustment circuit used for adjusting the voltage of the constant current control circuit, an input terminal of the voltage adjustment circuit and a first control terminal of the constant current control circuit are both connected to the output terminal of the constant current source unit, an output terminal of the voltage adjustment circuit is electrically connected to a first input terminal of the constant current control circuit, the first input terminal of the feedback unit, and the first input terminal of the switched-mode power supply module, respectively, the output terminal of the load is electrically connected to a second input terminal of the constant current control circuit, an output terminal of the constant current control circuit is electrically connected to the second input terminal of the feedback unit and the second input terminal of the switched-mode power supply module, respectively, and a second control terminal of the constant current control circuit is electrically connected to the output terminal of the feedback unit.

In one embodiment, the voltage adjustment circuit includes a fourth MOS transistor and a second voltage source, a gate of the fourth MOS transistor is electrically connected to an anode of the second voltage source, a drain of the fourth MOS transistor is electrically connected to the output terminal of the constant current source unit, and a source of the fourth MOS transistor is electrically connected to the first input terminal of the switched-mode power supply module.

In one embodiment, the constant current control circuit includes a fifth MOS transistor and at least one constant current control subcircuit, each constant current control subcircuit includes a sixth MOS transistor and a ninth MOS transistor, a drain of the fifth MOS transistor is electrically connected to the first input terminal of the switched-mode power supply module, a source of the fifth MOS transistor is electrically connected to a source of the sixth MOS transistor, a gate of the fifth MOS transistor is electrically connected to the drain of the fourth MOS transistor and a gate of the sixth MOS transistor, respectively, a drain of the sixth MOS transistor is electrically connected to the second input terminal of the feedback unit and a source of the ninth MOS transistor, respectively, a drain of the ninth MOS transistor is electrically connected to the output terminal of the load, and a gate of the ninth MOS transistor is electrically connected to the output terminal of the feedback unit.

In one embodiment, the number of the feedback units is equal to the number of the constant current control subcircuits, the feedback unit includes a first operational amplifier, an output terminal of the first operational amplifier is electrically connected to the gate of the ninth MOS transistor, a non-inverting input terminal of the first operational amplifier is electrically connected to the source of the fourth MOS transistor, and an inverting input terminal of the first operational amplifier is electrically connected to the drain of the sixth MOS transistor.

In one embodiment, the constant current source unit includes a reference current generation circuit for generating the reference current and a current mirror circuit, the reference current generation circuit includes a first voltage source, a reset resistor, a fourth operational amplifier, and a third MOS transistor, the current mirror circuit includes a first MOS transistor and a second MOS transistor, a non-inverting input terminal of the fourth operational amplifier is electrically connected to an anode of the first voltage source, an inverting input terminal of the fourth operational amplifier is electrically connected to a source of the third MOS transistor and is grounded through the reset resistor, an output terminal of the fourth operational amplifier is electrically connected to a gate of the third MOS transistor, a drain of the third MOS transistor is electrically connected to a drain and a gate of the first MOS transistor and a gate of the second MOS transistor, a source of the first MOS transistor is electrically connected to a source of the second MOS transistor, and a drain of the second MOS transistor is electrically connected to the drain of the fourth MOS transistor.

In one embodiment, the load is an LED.

In another aspect, the present invention relates to a television, which includes a constant current control device. In one embodiment, the constant current control device includes a constant current control module and a switched-mode power supply module used for providing a stable voltage for a load, the constant current control module includes a constant current source unit used for providing a reference current, a constant current control unit used for keeping a current flowing through the load constant as the reference current, and a feedback unit used for keeping the voltage of the constant current control unit constant, an output terminal of the switched-mode power supply module is electrically connected to an input terminal of the load, an output terminal of the constant current source unit is electrically connected to a first input terminal of the constant current control unit, an output terminal of the load is electrically connected to a second input terminal of the constant current control unit, an output terminal of the feedback unit is electrically connected to a control terminal of the constant current control unit, a first input terminal of the feedback unit and a first input terminal of the switched-mode power supply module are both connected to a first output terminal of the constant current control unit, and a second input terminal of the feedback unit and a second input terminal of the switched-mode power supply module are both connected to a second output terminal of the constant current control unit.

For the constant current control device disclosed in the present invention, a switched-mode power supply module provides a stable voltage for a load, a current passing through a load is precise controlled with a constant current control module that includes a constant current source unit, a constant current control unit, and a feedback unit, and specifically, the constant current source unit provides a reference current for a current flowing through a load, according to the reference current provided by the constant current source unit, the constant current control unit keeps the current flowing through the load constant as the reference current, and the feedback unit keeps the voltage of the constant current control unit constant to achieve the objective of precisely controlling the current passing through the load, so that the constant current control device of the present invention implements the objective of precisely controlling a current passing through a load with a simple circuit structure.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION OF THE INVENTION

Figure 1:
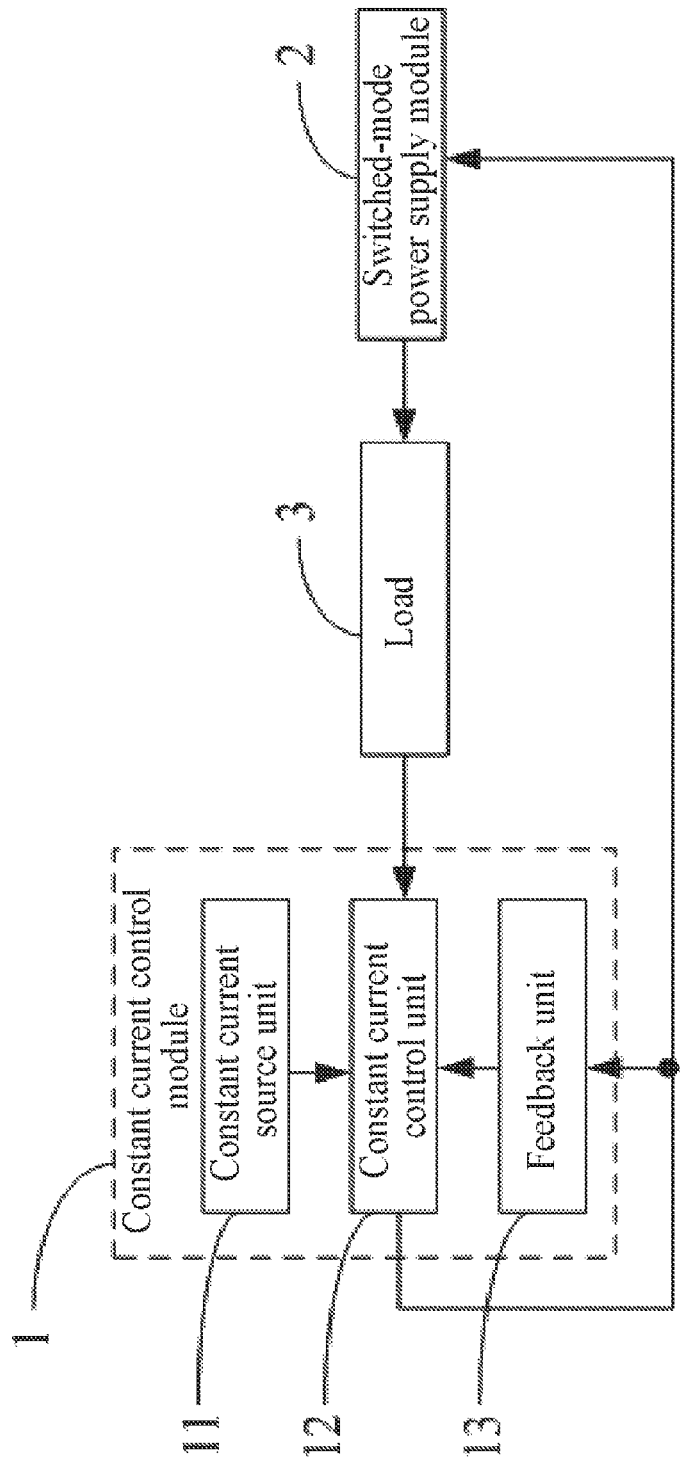
FIG. 1 shows a schematic block diagram of a constant current control device according to one embodiment of the present invention.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings in FIGS. 1-3. It should be understood that specific embodiments described herein are merely used for explaining the present invention, but are not intended to limit the present invention. In accordance with the purposes of this disclosure, as embodied and broadly described herein, this invention, in one aspect, relates to a constant current control device and a television including the same.

Referring to FIG. 1, a schematic block diagram of a constant current control device is shown according to one embodiment of the present invention. In this embodiment, the constant current control device includes a constant current control module 1 and a switched-mode power supply module 2 used for providing a stable voltage for a load 3. The constant current control module 1 includes a constant current source unit 11 used for providing a reference current, a constant current control unit 12 used for making a current flowing through the load 3 constant as the reference current, and a feedback unit 13 used for making the voltage of the constant current control unit 12 constant. An output terminal of the switched-mode power supply module 2 is electrically connected to an input terminal of the load 3, an output terminal of the constant current source unit 11 is electrically connected to a first input terminal of the constant current control unit 12, an output terminal of the load 3 is electrically connected to a second input terminal of the constant current control unit 12, an output terminal of the feedback unit 13 is electrically connected to a control terminal of the constant current control unit 12, a first input terminal of the feedback unit 13 and a first input terminal of the switched-mode power supply module 2 are both connected to a first output terminal of the constant current control unit 12, a second input terminal of the feedback unit 13 and a second input terminal of the switched-mode power supply module 2 are both connected to a second output terminal of the constant current control unit 12.

In the constant current control device as shown in FIG. 1, the switched-mode power supply module 2 provides a stable voltage for the load 3, and a current flowing through the load 3 is precisely controlled with the constant current control module 1 that includes the constant current source unit 11, the constant current control unit 12, and the feedback unit 13, and specifically, the constant current source unit 11 provides a reference current for the current flowing through the load 3, according to the reference current provided by the constant current source unit 11, the constant current control unit 12 keeps the current flowing through the load 3 constant as the reference current, and the feedback unit 13 keeps the voltage of the constant current control unit 12 constant to achieve the objective of precisely controlling the current flowing through the load 3, so that the constant current control device of the present invention implements the objective of precisely controlling a current passing through a load with a simple circuit structure.

Figure 2:
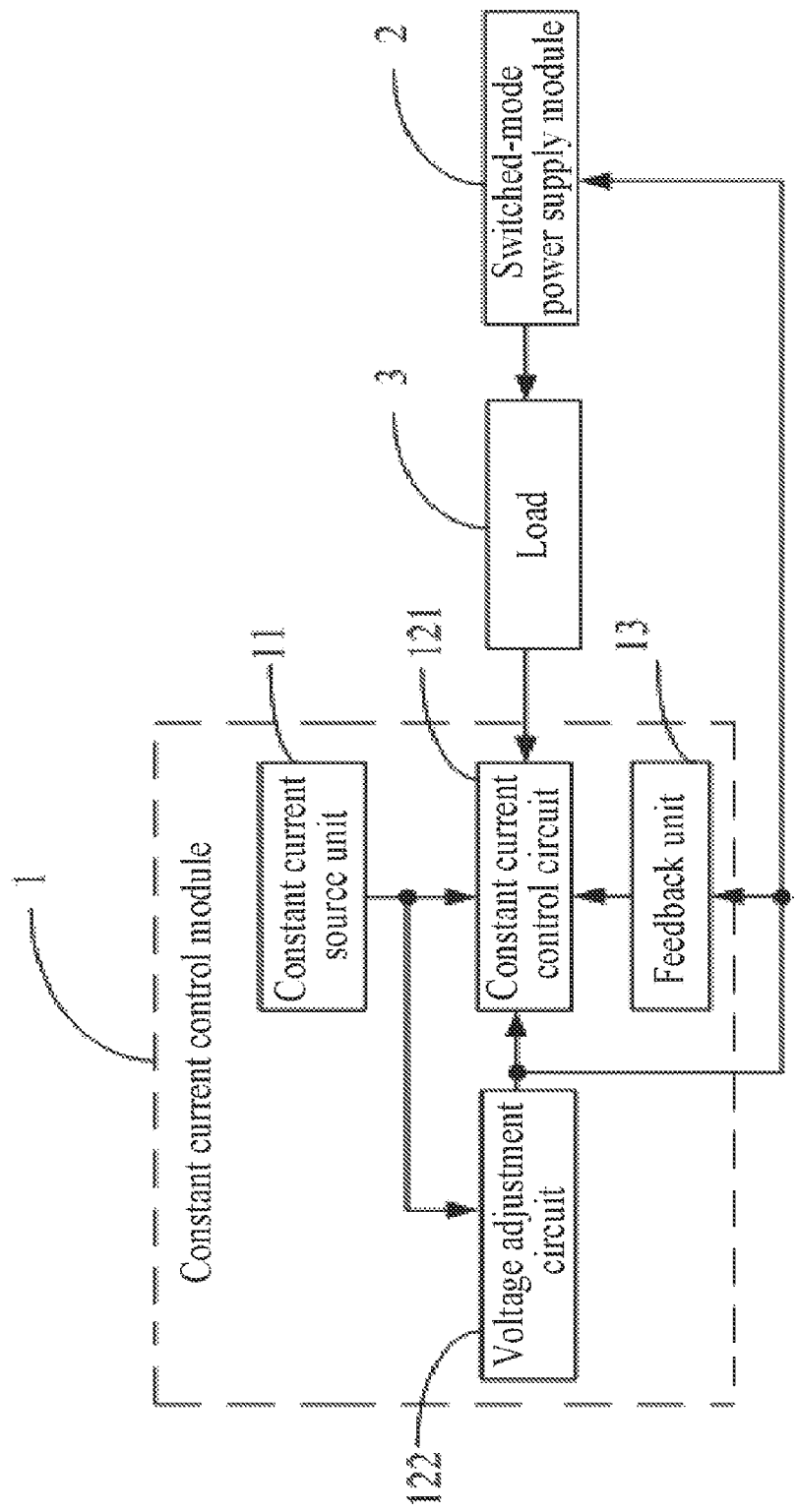
FIG. 2 is a schematic block diagram of a constant current control device according to another embodiment of the present invention.

Referring to FIG. 2, a schematic block diagram of a constant current control device is shown according to another embodiment of the present invention. In this embodiment, the constant current control device includes a constant current control module 1 and a switched-mode power supply module 2 used for providing a stable voltage for a load 3. The constant current control module 1 includes a constant current source unit 11 used for providing a reference current, a constant current control unit 12 used for keeping a current flowing through the load 3 constant as the reference current, and a feedback unit 13 used for keeping the voltage of the constant current control unit 12 constant. The constant current control unit 12 includes a constant current control circuit 121 and a voltage adjustment circuit 122 used for adjusting the voltage of the constant current control circuit 121. An input terminal of the voltage adjustment circuit 122 and a first control terminal of the constant current control circuit 121 are both connected to an output terminal of the constant current source unit 11, an output terminal of the voltage adjustment circuit 122 is electrically connected to a first input terminal of the constant current control circuit 121, a first input terminal of the feedback unit 13, and a first input terminal of the switched-mode power supply module 2, respectively, the output terminal of the load 3 is electrically connected to a second input terminal of the constant current control circuit 121, an output terminal of the constant current control circuit 121 is electrically connected to a second input terminal of the feedback unit 13 and a second input terminal of the switched-mode power supply module 2, respectively, and a second control terminal of the constant current control circuit 121 is electrically connected to an output terminal of the feedback unit 13. By setting the voltage adjustment circuit 122, on one aspect, the voltage of the constant current source unit 11 can be reduced to further reduce the power consumption; and on another aspect, the regulation of the current of the load 3 can be implemented in a wide range.

Figure 3:
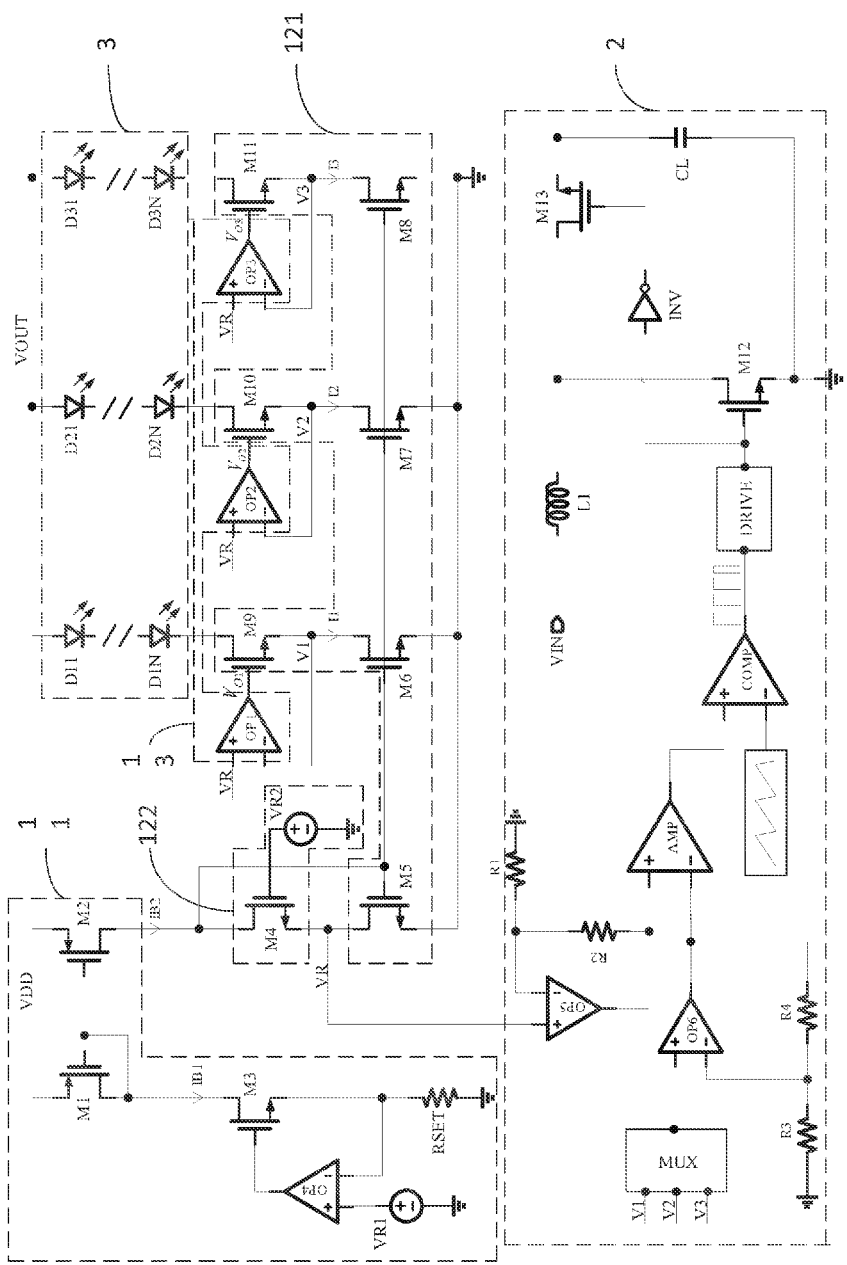
FIG. 3 is a schematic diagram of a constant current control device according to yet another embodiment of the present invention.

Referring to FIG. 3, a schematic diagram of a constant current control device is shown according to one embodiment of the present invention.

The voltage adjustment circuit 122 includes a fourth MOS transistor M4 and a second voltage source VR2, a gate of the fourth MOS transistor M4 is electrically connected to an anode of the second voltage source VR2, a drain of the fourth MOS transistor M4 is electrically connected to the output terminal of the constant current source unit 11, and a source of the fourth MOS transistor M4 is electrically connected to the first input terminal of the switched-mode power supply module 2.

The constant current control circuit 121 includes a fifth MOS transistor M5 and 3 constant current control subcircuits. The 3 constant current control subcircuits are a first constant current control subcircuit, a second constant current control subcircuit, and a third constant current control subcircuit, respectively. The first constant current control subcircuit includes a sixth MOS transistor M6 and a ninth MOS transistor M9, the second constant current control subcircuit includes a seventh MOS transistor M7 and a tenth MOS transistor M10, the third constant current control subcircuit includes an eighth MOS transistor M8 and an eleventh MOS transistor M11. A drain of the fifth MOS transistor M5 is electrically connected to the first input terminal of the switched-mode power supply module 2, a source of the fifth MOS transistor M5 is electrically connected to a source of the sixth MOS transistor M6, a source of the seventh MOS transistor M7, and a source of the eighth MOS transistor M8 respectively and forms a current mirror respectively, a gate of the fifth MOS transistor M5 is electrically connected to the drain of the fourth MOS transistor M4, a gate of the sixth MOS transistor M6, a gate of the seventh MOS transistor M7, and a gate of the eighth MOS transistor M8, respectively, a drain of the sixth MOS transistor M6 is electrically connected to the second input terminal of the feedback unit 13 and is electrically connected to a source of the ninth MOS transistor M9, a drain of the seventh MOS transistor M7 is electrically connected to the second input terminal of the feedback unit 13 and is electrically connected to a source of the tenth MOS transistor M10, a drain of the eighth MOS transistor M8 is electrically connected to the second input terminal of the feedback unit 13 and is electrically connected to a source of the eleventh MOS transistor M11, a drain of the ninth MOS transistor M9, a drain of the tenth MOS transistor M10, and a drain of the eleventh MOS transistor M11 are electrically connected to the output terminal of the load 3, respectively, a gate of the ninth MOS transistor M9, a gate of the tenth MOS transistor M10, and a gate of the eleventh MOS transistor M11 are electrically connected to the output terminal of the feedback unit 13, respectively.

The feedback units 13 corresponding to the 3 constant current control subcircuits respectively include a first feedback unit, a second feedback unit, and a third feedback unit. The first feedback unit includes a first operational amplifier OP1, the second feedback unit includes a second operational amplifier OP2, and the third feedback unit includes a third operational amplifier OP3. An output terminal of the first operational amplifier OP1 is electrically connected to a gate of the ninth MOS transistor M9, a non-inverting input terminal of the first operational amplifier OP1 is electrically connected to the source of the fourth MOS transistor M4, and an inverting input terminal of the first operational amplifier OP1 is electrically connected to the drain of the sixth MOS transistor M6. An output terminal of the second operational amplifier OP2 is electrically connected to the gate of the tenth MOS transistor M10, a non-inverting input terminal of the second operational amplifier OP2 is electrically connected to the source of the fourth MOS transistor M4, an inverting input terminal of the second operational amplifier OP2 is electrically connected to the drain of the seventh MOS transistor M7. An output terminal of the third operational amplifier OP3 is electrically connected to the gate of the eleventh MOS transistor M11, a non-inverting input terminal of the third operational amplifier OP3 is electrically connected to the source of the fourth MOS transistor M4, and an inverting input terminal of the third operational amplifier OP3 is electrically connected to the drain of the eleventh MOS transistor M11.

The constant current source unit 11 includes a reference current generation circuit for generating the reference current and a current mirror circuit; The reference current generation circuit includes a first voltage source VR1, a reset resistor RSET, a fourth operational amplifier OP4, and a third MOS transistor M3. The current mirror circuit includes a first MOS transistor M1 and a second MOS transistor M2. A non-inverting input terminal of the fourth operational amplifier OP4 is electrically connected to an anode of the first voltage source VR1, an inverting input terminal of the fourth operational amplifier OP4 is electrically connected to a source of the third MOS transistor M3 and is grounded through the reset resistor RSET, an output terminal of the fourth operational amplifier OP4 is electrically connected to a gate of the third MOS transistor M3, a drain of the third MOS transistor M3 is electrically connected to a drain and a gate of the first MOS transistor M1 and a gate of the second MOS transistor M2, a source of the first MOS transistor M1 is electrically connected to a source of the second MOS transistor M2, and a drain of the second MOS transistor M2 is electrically connected to the drain of the fourth MOS transistor M4.

The switched-mode power supply module 2 includes an input port VIN, a fifth operational amplifier OP5, a sixth operational amplifier OP6, an error amplifier AMP, a comparator COMP, a minimum level selector MUX, a power transistor drive DRIVE, an inverter INV, a first inductor L1, a load capacitor CL, a twelfth MOS transistor M12, a thirteenth MOS transistor M13, a first resistor R1, a second resistor R2, a third resistor R3, and a fourth resistor R4. The input port VIN is electrically connected to a drain of the twelfth MOS transistor M12 and a drain of the thirteenth MOS transistor M13 respectively through the first inductor L1, a source of the twelfth MOS transistor M12 is grounded, a gate of the twelfth MOS transistor M12 is electrically connected to an output terminal of the power transistor drive DRIVE and is electrically connected to an input terminal of the inverter INV, an output terminal of the inverter INV is electrically connected to a gate of the thirteenth MOS transistor M13, a source of the thirteenth MOS transistor M13 is grounded through the load capacitor CL, an input terminal of the power transistor drive DRIVE is electrically connected to an output terminal of the comparator COMP, an inverting input terminal of the comparator COMP is electrically connected to a triangle wave signal generator, a non-inverting input terminal of the comparator COMP is electrically connected to an output terminal of the error amplifier AMP, an non-inverting input terminal of the error amplifier AMP is electrically connected to an output terminal of the fifth operational amplifier OP5 and is grounded through the second resistor R2 and the first resistor R1, a non-inverting input terminal of the fifth operational amplifier OP5 is electrically connected to the source of the fourth MOS transistor M4, an inverting input terminal of the fifth operational amplifier OP5 is grounded through the first resistor R1, the inverting input terminal of the error amplifier AMP is electrically connected to an output terminal of the sixth operational amplifier OP6 and is grounded through the fourth resistor R4 and the third resistor R3, an inverting input terminal of the sixth operational amplifier OP6 is grounded through the third resistor R3, a non-inverting input terminal of the sixth operational amplifier OP6 is electrically connected to an output terminal of the minimum level selector MUX, three input terminals of the minimum level selector MUX are electrically connected to the drain of the sixth MOS transistor M6, the drain of the seventh MOS transistor M7, and the drain of the eighth MOS transistor M8, respectively.

In a variant embodiment, the number of the loads 3 is not limited to 3, so the number of the constant current control subcircuits and the number of negative feedback units are also not limited to three, any number of the loads 3 may be set as required, and correspondingly, the number of the constant current control subcircuits and the number of the negative feedback units should be consistent with the number of the loads 3.

In a specific embodiment, the load 3 is an LED.

The working principle of the constant current control module 1 is: IB1=VR1/RSET, as the first MOS transistor M1 and the second MOS transistor M2 form a current mirror, IB2=k·IB1 (k is a constant). The fifth MOS transistor M5 forms a current mirror with the sixth MOS transistor M6, the seventh MOS transistor M7, and the eighth MOS transistor M8, respectively. The first operational amplifier OP1 and the ninth MOS transistor M9, the second operational amplifier OP2 and the tenth MOS transistor M10, and the third operational amplifier OP3 and the eleventh MOS transistor M11, form a negative feedback loop, respectively, so that the voltages of the nodes V1, V2, and V3 are strictly equal to the voltage of the node VR(VR=VR2−$V_{GS4}$). Therefore, the currents I1, I2, and I3 are strict duplicates of the current IB2.

The working principle of the switched-mode power supply module 2 is as follows: the fifth operational amplifier OP5, the first resistor R1, and the second resistor R2 form a first linear amplification unit, the sixth operational amplifier OP6, the third resistor R3, and the fourth resistor R4 form a second linear amplification unit, the first inductor L1, the load capacitor CL, the twelfth MOS transistor M12, and the thirteenth MOS transistor M13 form a peripheral power device for the switched-mode power supply, the minimum level selector MUX selects a minimum level output from input levels V1, V2, and V3. The error amplifier AMP amplifies the difference value between VR·(R1+R2)/R1 and min(V1, V2, V3)·(R3+R4)/R3 , the comparator COMP compares the amplified difference value signal and the triangle wave output by the triangle wave signal generator to obtain different pulse signals of a duty cycle D, the power transistor drives DRIVE intensifies the power drive capability for the pulse signal and drives the twelfth MOS transistor M12 and the thirteenth MOS transistor M13 to eventually obtain the output voltage source VOUT of the switched-mode power supply module 2, VOUT=VIN/(1−D).

The working principle of the constant current control device of the present invention is as follows: it is assumed that the current I2 decreases, so the voltage V2 reduces, the output level of the second operational amplifier OP2 rises, and the voltage V2 (V2=$V_{O2}$−$V_{GS10}$↓) increases; if the voltage V2 reduces to the minimum value among V1, V2, and V3, the reduced voltage V2 is output through the minimum level selector MUX, undergoes linear amplification, and is input to the inverted input terminal of the error amplifier AMP, so as to form a difference value from a linear multiple of VR, and the level at the output terminal of the error amplifier AMP rises and undergoes the comparison with the triangle wave by the comparator COMP, the pulse duty cycle D increases. Therefore, the output voltage of the switched-mode power supply rises, VOUT=VIN/(1−D↑).

Subsequent to the rise of the VOUT, as the currents I1 and I3 go through the negative feedback loop formed of the first operational amplifier OP1 and the ninth MOS transistor M9 and the negative feedback loop formed of the third operational amplifier OP3 and the eleventh MOS transistor M11 respectively, the voltages V1 and V3 keep unchanged, so that the currents I1 and I3 keep stable and unchanged; as the voltage V2 rises through the negative feedback loop formed of the second operational amplifier OP2 and the tenth MOS transistor M10, the value of the current I2 increases. Eventually, the values of the currents I1, I2, and I3 keep consistent.

It is assumed that the current I2 increases, so the voltage V2 rises, the output level of the second operational amplifier OP2 reduces, and the voltage V2 (V2=$V_{O2}$−$V_{GS10}$↑) reduces; if the voltage V2 rises to be not the minimum value of V1, V2, and V3, the minimum value of V1, V2, and V3 increases a bit, is output by the minimum level selector MUX, undergoes linear amplification, and is input to the inverted input terminal of the error amplifier AMP, so as to form a difference value from a linear multiple of VR, and the level at the output terminal of the error amplifier AMP decreases and undergoes the comparison with the triangle wave by the comparator COMP, the pulse duty cycle D reduces. Therefore, the output voltage of the switched-mode power supply reduces, VOUT=VIN/(1−D↓).

Subsequent to the reduction of the VOUT, as the currents I1 and I3 go through the negative feedback loop formed by the first operational amplifier OP1 and the ninth MOS transistor M9 and the negative feedback loop formed of the third operational amplifier OP3 and the eleventh MOS transistor M11 respectively, the voltages V1 and V3 keep unchanged, so that the currents I1 and I3 keep stable and unchanged; as the negative feedback loop formed of the second operational amplifier OP2 and the tenth MOS transistor M10, the voltage V2 reduces, so that the value of the current I2 reduces. Eventually, the values of the currents I1, I2, and I3 keep consistent.

The key point of the technology of the present invention is to select one reference voltage VR corresponding to a bias current source IB2. When different bias current sources IB2 are set, the reference voltage VR changes accordingly, and the control precision of each current is not affected by the value of the current. The error amplifier AMP amplifies the difference value between the reference voltage VR and the drain voltage min (V1, V2, V3), the difference value is then compared with a triangle wave, and the duty cycle of the pulse is regulated, so as to rapidly adjust the output voltage source of the switched-mode power supply module 2. The conversion efficiency and the response speed of the entire constant current control device are improved. In addition, an external power transistor is required for the present invention, so that the area of the entire board-level system is reduced and also the cost of the entire application solution is reduced.

In another aspect, the present invention relates to a television that includes the constant current control device, as discussed above and shown in FIGS. 1-3. The details of the constant current control device are no longer elaborated herewith.

As the television includes the constant current control device, the television has all the advantages of the constant current control device in the embodiments above, for example, the circuit structure is simplified, and the objective of precisely controlling a current flowing through a load is implemented.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A constant current control device, comprising:
a constant current control module;
a switched-mode power supply module, used for providing a stable voltage for a load;
wherein the constant current control module comprises:
a constant current source unit used for providing a reference current;
a constant current control unit used for keeping a current flowing through the load constant as the reference current; and
a feedback unit used for keeping the voltage of the constant current control unit constant,
wherein an output terminal of the switched-mode power supply module is electrically connected to an input terminal of the load;
an output terminal of the constant current source unit is electrically connected to a first input terminal of the constant current control unit;
an output terminal of the load is electrically connected to a second input terminal of the constant current control unit;
an output terminal of the feedback unit is electrically connected to a control terminal of the constant current control unit;
both of a first input terminal of the feedback unit and a first input terminal of the switched-mode power supply module are electrically connected to a first output terminal of the constant current control unit; and
a second input terminal of the feedback unit and a second input terminal of the switched-mode power supply module are both connected to a second output terminal of the constant current control unit.

2. The constant current control device according to claim 1, wherein the constant current control unit comprises:
a constant current control circuit; and
a voltage adjustment circuit used for adjusting the voltage of the constant current control circuit,
wherein both of an input terminal of the voltage adjustment circuit and a first control terminal of the constant current control circuit are electrically connected to the output terminal of the constant current source unit;
an output terminal of the voltage adjustment circuit is electrically connected to a first input terminal of the constant current control circuit, the first input terminal of the feedback unit, and the first input terminal of the switched-mode power supply module, respectively;
the output terminal of the load is electrically connected to a second input terminal of the constant current control circuit;
an output terminal of the constant current control circuit is electrically connected to the second input terminal of the feedback unit and the second input terminal of the switched-mode power supply module, respectively; and
a second control terminal of the constant current control circuit is electrically connected to the output terminal of the feedback unit.

3. The constant current control device according to claim 2, wherein the voltage adjustment circuit comprises:
a second voltage source; and
a fourth MOS transistor,
wherein a gate of the fourth MOS transistor is electrically connected to an anode of the second voltage source, a drain of the fourth MOS transistor is electrically connected to the output terminal of the constant current source unit, and a source of the fourth MOS transistor is electrically connected to the first input terminal of the switched-mode power supply module.

4. The constant current control device according to claim 3, wherein the constant current control circuit comprises:
a fifth MOS transistor; and
at least one constant current control subcircuit,
wherein each constant current control subcircuit comprises a sixth MOS transistor and a ninth MOS transistor, wherein a drain of the fifth MOS transistor is electrically connected to the first input terminal of the switched-mode power supply module, a source of the fifth MOS transistor is electrically connected to a source of the sixth MOS transistor, a gate of the fifth MOS transistor is electrically connected to the drain of the fourth MOS transistor and a gate of the sixth MOS transistor, respectively; and
wherein a drain of the sixth MOS transistor is electrically connected to the second input terminal of the feedback unit and a source of the ninth MOS transistor, respectively, a drain of the ninth MOS transistor is electrically connected to the output terminal of the load, and a gate of the ninth MOS transistor is electrically connected to the output terminal of the feedback unit.

5. The constant current control device according to claim 4, wherein the number of the feedback units is equal to the number of the constant current control subcircuits, wherein the feedback unit comprises a first operational amplifier, an output terminal of the first operational amplifier is electrically connected to the gate of the ninth MOS transistor, a non-inverting input terminal of the first operational amplifier is electrically connected to the source of the fourth MOS transistor, and an inverting input terminal of the first operational amplifier is electrically connected to the drain of the sixth MOS transistor.

6. The constant current control device according to claim 5, wherein the constant current source unit comprises:
a reference current generation circuit for generating the reference current; and
a current mirror circuit,
wherein the reference current generation circuit comprises a first voltage source, a reset resistor, a fourth operational amplifier and a third MOS transistor; and
wherein the current mirror circuit comprises a first MOS transistor and a second MOS transistor;
wherein a non-inverting input terminal of the fourth operational amplifier is electrically connected to an anode of the first voltage source, an inverting input terminal of the fourth operational amplifier is electrically connected to a source of the third MOS transistor and is grounded through the reset resistor, an output terminal of the fourth operational amplifier is electrically connected to a gate of the third MOS transistor, and
wherein a drain of the third MOS transistor is electrically connected to a drain and a gate of the first MOS transistor and a gate of the second MOS transistor, a source of the first MOS transistor is electrically connected to a source of the second MOS transistor, and a drain of the second MOS transistor is electrically connected to the drain of the fourth MOS transistor.

7. The constant current control device according to any one of claim 1, wherein the load comprises at least one light emitting diode (LED).

8. A television, comprising a constant current control device, wherein the constant current control device, comprising:
- a constant current control module;
- a switched-mode power supply module, used for providing a stable voltage for a load;
- wherein the constant current control module comprises:
  - a constant current source unit used for providing a reference current;
  - a constant current control unit used for keeping a current flowing through the load constant as the reference current; and
  - a feedback unit used for keeping the voltage of the constant current control unit constant,
- wherein an output terminal of the switched-mode power supply module is electrically connected to an input terminal of the load;
- an output terminal of the constant current source unit is electrically connected to a first input terminal of the constant current control unit;
- an output terminal of the load is electrically connected to a second input terminal of the constant current control unit;
- an output terminal of the feedback unit is electrically connected to a control terminal of the constant current control unit;
- both of a first input terminal of the feedback unit and a first input terminal of the switched-mode power supply module are electrically connected to a first output terminal of the constant current control unit; and
- a second input terminal of the feedback unit and a second input terminal of the switched-mode power supply module are both connected to a second output terminal of the constant current control unit.

9. The television according to claim 8, wherein the constant current control unit comprises:
- a constant current control circuit; and
- a voltage adjustment circuit used for adjusting the voltage of the constant current control circuit,
- wherein both of an input terminal of the voltage adjustment circuit and a first control terminal of the constant current control circuit are electrically connected to the output terminal of the constant current source unit;
- an output terminal of the voltage adjustment circuit is electrically connected to a first input terminal of the constant current control circuit, the first input terminal of the feedback unit, and the first input terminal of the switched-mode power supply module, respectively;
- the output terminal of the load is electrically connected to a second input terminal of the constant current control circuit;
- an output terminal of the constant current control circuit is electrically connected to the second input terminal of the feedback unit and the second input terminal of the switched-mode power supply module, respectively; and
- a second control terminal of the constant current control circuit is electrically connected to the output terminal of the feedback unit.

10. The television according to claim 9, wherein the voltage adjustment circuit comprises:
- a second voltage source; and
- a fourth MOS transistor,
- wherein a gate of the fourth MOS transistor is electrically connected to an anode of the second voltage source, a drain of the fourth MOS transistor is electrically connected to the output terminal of the constant current source unit, and a source of the fourth MOS transistor is electrically connected to the first input terminal of the switched-mode power supply module.

11. The television according to claim 10, wherein the constant current control circuit comprises:
- a fifth MOS transistor; and
- at least one constant current control subcircuit,
- wherein each constant current control subcircuit comprises a sixth MOS transistor and a ninth MOS transistor, wherein a drain of the fifth MOS transistor is electrically connected to the first input terminal of the switched-mode power supply module, a source of the fifth MOS transistor is electrically connected to a source of the sixth MOS transistor, a gate of the fifth MOS transistor is electrically connected to the drain of the fourth MOS transistor and a gate of the sixth MOS transistor, respectively; and
- wherein a drain of the sixth MOS transistor is electrically connected to the second input terminal of the feedback unit and a source of the ninth MOS transistor, respectively, a drain of the ninth MOS transistor is electrically connected to the output terminal of the load, and a gate of the ninth MOS transistor is electrically connected to the output terminal of the feedback unit.

12. The television according to claim 11, wherein the number of the feedback units is equal to the number of the constant current control subcircuits, wherein the feedback unit comprises a first operational amplifier, an output terminal of the first operational amplifier is electrically connected to the gate of the ninth MOS transistor, a non-inverting input terminal of the first operational amplifier is electrically connected to the source of the fourth MOS transistor, and an inverting input terminal of the first operational amplifier is electrically connected to the drain of the sixth MOS transistor.

13. The television according to claim 12, wherein the constant current source unit comprises:
- a reference current generation circuit for generating the reference current; and
- a current mirror circuit,
- wherein the reference current generation circuit comprises a first voltage source, a reset resistor, a fourth operational amplifier and a third MOS transistor; and
- wherein the current mirror circuit comprises a first MOS transistor and a second MOS transistor;
- wherein a non-inverting input terminal of the fourth operational amplifier is electrically connected to an anode of the first voltage source, an inverting input terminal of the fourth operational amplifier is electrically connected to a source of the third MOS transistor and is grounded through the reset resistor, an output terminal of the fourth operational amplifier is electrically connected to a gate of the third MOS transistor, and
- wherein a drain of the third MOS transistor is electrically connected to a drain and a gate of the first MOS transistor and a gate of the second MOS transistor, a source of the first MOS transistor is electrically connected to a source of the second MOS transistor, and a drain of the second MOS transistor is electrically connected to the drain of the fourth MOS transistor.

14. The constant current control device according to claim 8, wherein the load comprises at least one light emitting diode (LED).

* * * * *